W. MORRISON.
STORAGE BATTERY ELECTRODE OR GRID.
APPLICATION FILED AUG. 8, 1913.

1,227,295.

Patented May 22, 1917.
2 SHEETS—SHEET 1.

WITNESSES
Fenton S. Belt
Robert I. Hulsizer

INVENTOR
William Morrison
by Byrnes Townsend & Brickenstein
Attorneys

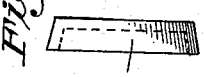
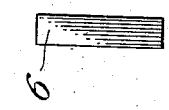
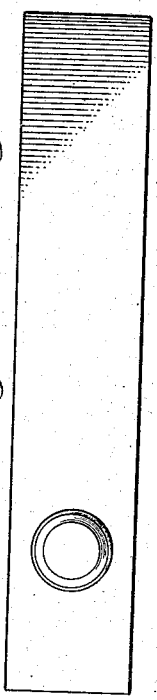
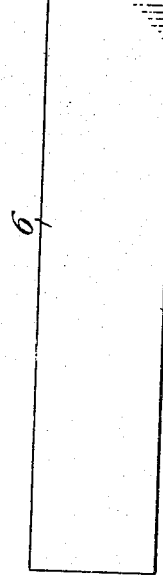
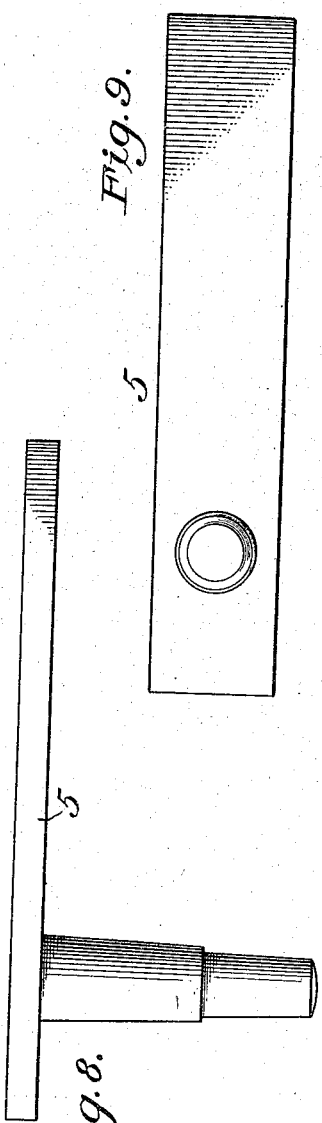

UNITED STATES PATENT OFFICE.

WILLIAM MORRISON, OF DES MOINES, IOWA.

STORAGE-BATTERY ELECTRODE OR GRID.

1,227,295.   Specification of Letters Patent.   Patented May 22, 1917.

Application filed August 8, 1913. Serial No. 783,829.

*To all whom it may concern:*

Be it known that I, WILLIAM MORRISON, a citizen of the United States, residing at Des Moines, in the county of Polk and State of Iowa, have invented certain new and useful Improvements in Storage-Battery Electrodes or Grids, of which the following is a specification.

This invention relates to electrodes or grids for storage batteries, and to the manner by which the several parts are assembled and electrically and mechanically united.

The object of my invention is to provide an electrode in which there is a maximum of surface exposed to the electro-chemical action for a given weight of metal; and in which the conductivity of the electrode is maintained at a maximum, due to superior electrical contact between the several parts; and in which the mechanical strength is higher than in electrodes of this design heretofore produced.

In the accompanying drawings,—

Fig. 3 is a front view, in elevation, of a trough-like side-piece showing its flaring edges;

Fig. 4 is an end view of the same;

Fig. 5 is a back view of the same, also showing the flaring edges;

Figs. 6 and 7 are views of the bottom end of the frame; and Figs. 8 and 9 are side and top views of the top end of the frame, showing the connector post of the plate.

Figures 1, 2:
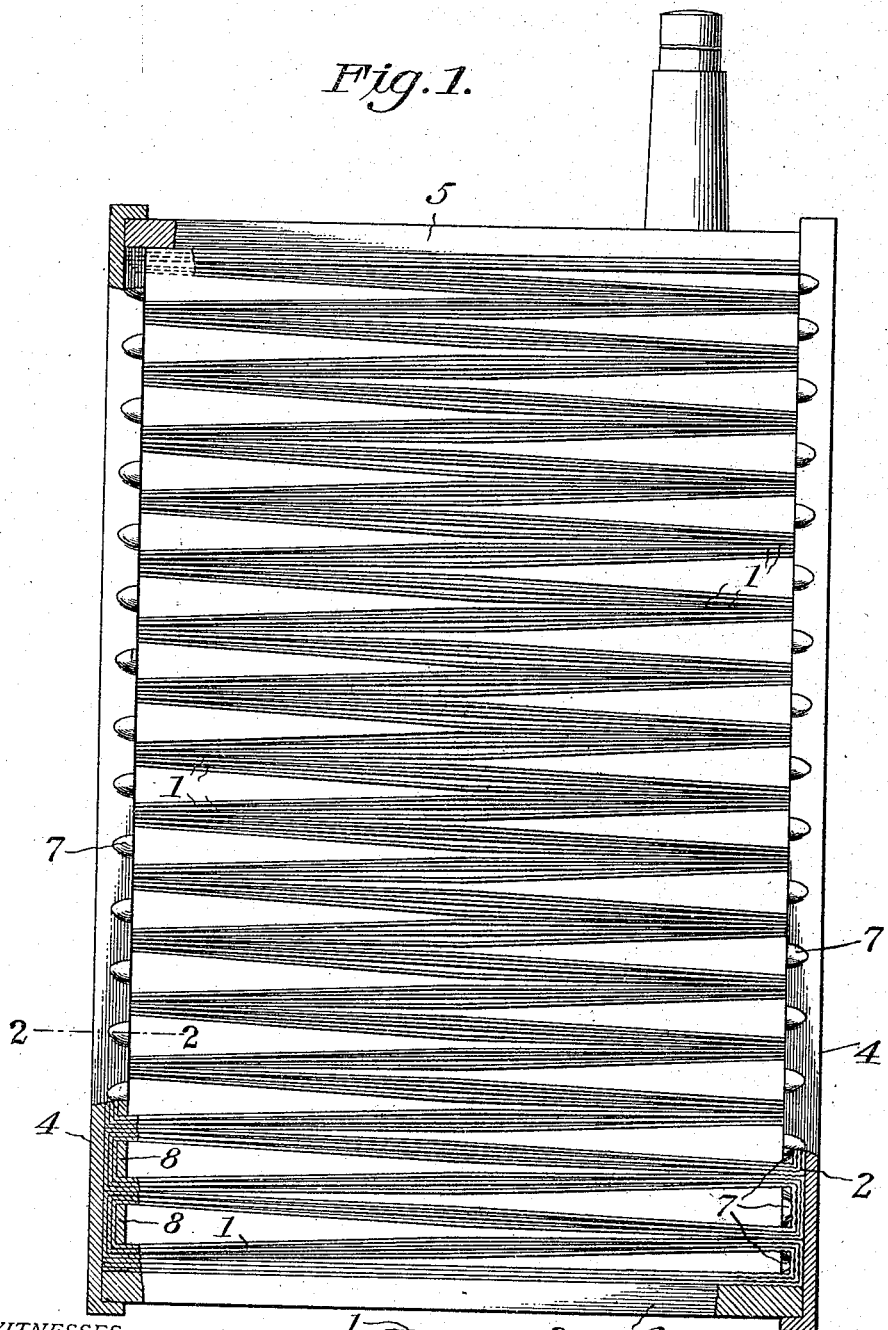
Figure 1 is an elevation of a completed electrode, having portions broken away on the sides to show the method of folding strip-lead at the ends.
Fig. 2 is a view of a section on the line 2—2 of Fig. 1, showing the crimped edges and part of a layer of soldering metal above the strip-lead.

As shown in Fig. 1, several narrow strips of sheet lead 1, each of which has been run through a corrugating machine producing a corrugated or wavy surface shown on edge at 2, and in elevation at 3 in Fig. 1, and of which three are shown in Fig. 1, are run through a bending machine which bends them into preferably rectangular serpentine folds, nested, as shown, the square ends of the folds providing a good electrical connection and a strong joint mechanically with the trough-like side-pieces 4. The folded strips are pressed together at the top and bottom portions, until the several folds touch at the ends; end-pieces 5, 6 are then applied and the folded strips with the end-pieces are pressed into the trough-like side-pieces 4, 4 of pure lead, which are so proportioned as to fit tightly upon and firmly hold together the parts. The plate thus assembled is now placed in a crimping-press in which the flaring edges of the side-pieces are pressed against the folded strips, and portions thereof crimped or depressed at the spaces within the ends of the folds, as shown at 7 in Figs. 1 and 2, whereby the folded strips 1, and end-pieces 5, 6 are immovably clamped or bound within the trough-like side-pieces, as will be readily understood. The folded strips, end-pieces and side-pieces are now suitably soldered or welded together by filling the troughs with molten metal 8, such as lead, whereby all the interstices between the folded strips, and the folds and side-pieces are filled with metal, and the parts thereby united into a rigid plate of unusual mechanical strength and of superior electrical conductivity owing to the high conductivity of the pure lead side-pieces and the relatively large surface of strip-lead in intimate contact therewith at the square bends in the folds.

The soldering metal covers the squared ends of the folds as shown at 8 in the broken-away portion at the lower left-hand side of Fig. 1. The lower right-hand broken-away portion of Fig. 1 shows a section of the parts before the soldering metal has been introduced.

While primarily designed for electrodes of the Planté type, it is obvious that electrodes of the Fauré or pasted type can also be made in this manner, with equally good results.

While I prefer to make the folded strips in the manner above described, my invention is not limited to this particular method of arranging the strips. Thus, it is not essential that the strips be made in continuous lengths, as separate bundles of strips might be used, or other methods of assembling the metal which supports the active material, or is itself to be transformed into the active material, might be adopted and yet be within the spirit of my invention.

I claim:—

1. A storage battery electrode or grid, consisting of folded strips of metal, end-pieces to support said folded strips, trough-shaped side-pieces inclosing the ends of the folded strips and the extremities of the end-pieces, said folded strips, end pieces and side-pieces integrally united to each other.

2. A storage battery electrode or grid, consisting of folded strips of metal, end-pieces to support said folded strips, and trough-like side-pieces inclosing the ends of the folded strips and the extremities of the end-pieces.

3. A storage battery electrode or grid, consisting of a plurality of strips of metal, folded into serpentine folds, having squared ends, end-pieces to support said folded strips, and side-pieces inclosing the folded ends of the strips and the extremities of the end-pieces.

4. A storage battery electrode or grid, consisting of a plurality of strips of metal, folded into serpentine folds, end-pieces to support said folded strips, trough-shaped side-pieces inclosing the folded ends of the strips and the extremities of the end-pieces, said folded strips, side-pieces and end-pieces integrally united to each other.

5. A storage battery electrode or grid, comprising a plurality of strips of metal folded into serpentine folds, the inner sides of said folds being separated, trough-like side-pieces inclosing the ends of said folds and having an extended surface contact therewith, the edges of said side-pieces having crimped or depressed portions to mechanically clamp the inner sides of the folds of the strips, said folded strips integrally united to said side-pieces.

6. A storage battery electrode or grid, comprising a plurality of strips of metal folded into serpentine folds having rectangular ends, the inner sides of said folds being separated, side-pieces inclosing the ends of said rectangular folds and having an extended surface contact therewith, the edges of said side-pieces having crimped or depressed portions to mechanically clamp the inner sides of the rectangular folds of the strips, said folded strips, side-pieces and end-pieces all integrally united together.

7. A storage battery electrode or grid comprising a plurality of strips of lead bent into folds having squared ends, side-pieces contacting with said squared ends and having turned-up edges inclosing said folds, said side-pieces integrally secured to said folds.

8. A storage battery electrode or grid comprising a plurality of strips of lead folded into rectangular folds and in nested relation to each other, the rectangular folds so proportioned as to expose an extended surface for contact, adjacent rectangular folds on the same side of the plate contacting with each other, trough-like side-pieces inclosing said rectangular folds and contacting with said extended surface, and having crimped edges to mechanically bind the folded strips, said trough-like side-pieces integrally united to said folds.

9. A storage battery electrode or grid having a frame comprising end-pieces and side-pieces extending over the ends of the end-pieces, metal strips having squared bent portions and inclosed within said frame, the end-pieces and squared bent portions integrally united to the side-pieces.

10. A storage battery electrode or grid having a frame comprising end-pieces and grooved side-pieces, metal strips having squared bent portions inclosed within said frame, the end-pieces and squared bent portions extending into said grooves and integrally united thereto.

11. A storage battery or electrode consisting of active material inclosed within a frame consisting of end-pieces and trough-shaped side-pieces extending over the ends of the end-pieces and integrally united thereto.

In testimony whereof I affix my signature in presence of two witnesses.

WILLIAM MORRISON.

Witnesses:
JOSEPH W. HARRIS,
C. W. FOWLER.

Copies of this patent may be obtained for five cents each, by addressing the "Commissioner of Patents. Washington, D. C."